United States Patent [19]

Nozaki

[11] Patent Number: 5,117,798
[45] Date of Patent: Jun. 2, 1992

[54] FUEL SUPPLYING SYSTEM OF A GAS-ENGINE

[75] Inventor: Toshihiro Nozaki, Aichi, Japan

[73] Assignee: Aisin Seiki Kabushiki Kaisha, Kariya, Japan

[21] Appl. No.: 589,615

[22] Filed: Sep. 28, 1990

[30] Foreign Application Priority Data

Sep. 28, 1989 [JP] Japan ................. 1-113702[U]

[51] Int. Cl.⁵ .............................................. F02B 43/00
[52] U.S. Cl. .................................. 123/527; 123/27 GE
[58] Field of Search ........................ 123/527, 27 GE; 137/495, 505.14

[56] References Cited

U.S. PATENT DOCUMENTS 1,461,662  7/1923  Kawamura .................... 137/495
4,369,751  1/1983  Batchelor et al. ............ 123/527

FOREIGN PATENT DOCUMENTS 60-17261  1/1985  Japan ............................ 123/527
61-185667  8/1986  Japan ......................... 123/27 GE Primary Examiner—Noah P. Kamen
Attorney, Agent, or Firm—Banner, Birch, McKie & Beckett

[57] ABSTRACT

A fuel supplying system of a gas-engine is comprised of a gas-engine, an intake manifold, a mixer communicated with the gas-engine via the intake manifold, a fuel passage, a gas tank communicated with the mixer via the fuel passage, an air passage, an air cleaner communicated with the mixer via the air passage, and a governor inserted in the fuel passage. The governor is comprised of a first gas room, a second gas room, an opening between the first gas room and the second gas room, and an atmospheric pressure room defined in the second gas room by a first diaphragm. The opening between the first gas room and the second gas room is open and closed by a valve. A lever is fixed to the valve and a first spring urges the valve to close the opening. An apparatus is supplied for varying the urging force of the spring.

10 Claims, 4 Drawing Sheets

FUEL SUPPLYING SYSTEM OF A GAS-ENGINE

BACKGROUND OF THE INVENTION

1. Field of the Invention

The present invention relates to a fuel supplying system of a gas-engine and more particularly to a fuel supplying system of a gas-engine of a lean-burn type.

2. Description of the Related Art

A conventional fuel supplying system of a gas-engine, as shown in FIG. 9, is disclosed in Japanese Utility Model Laid-open Print No. 58(1983)-142357 published without examination, wherein fuel for gas-engine 101 is composed of a mixture of gas and air. Gas and air are mixed in mixer 102. Governor 105 and bypass passage 106 are located on fuel passage 104. Valve 107 is located on bypass passage 106. Gas in gas-tank 103 is enclosed at a high pressure. However, the pressure of the gas is reduced to atmospheric pressure in governor 105. Air is supplied to mixer 102 from air-cleaner 108 via air passage 109.

Starter 110 starts gas-engine 101. When switch 111 is turned on, valve 107 opens, and starter 110 is activated.

Gas-engine 101 is a lean-burn type engine which exhausts a small amount of NOx (Nitrogen Oxide). Therefore, the quantity of gas is very small compared to the quantity of air. Gas-engine 101 has the disadvantageous characteristic of bad starting capacity. For good starting capacity of gas-engine 101, the quantity of gas is increased by opening valve 107.

However, the gas supplied via valve 107 is at a high pressure, namely, it is not reduced to atmospheric pressure. When gas-engine 101 is started, the flowing gas is at two different pressures: the atmospheric pressure and the high pressure of gas-tank 103. Therefore, it is difficult to control gas-engine 101.

SUMMARY OF THE INVENTION

Accordingly, it is a primary object of the present invention to elevate bad starting capacity of a gas-engine.

The above and other objectives are achieved in the present invention by a fuel supplying system of a gas-engine which is comprised of: an intake manifold, a mixer connected to the gas-engine via the intake manifold, a fuel passage, a gas tank connected to the mixer via the fuel passage, an air passage connected to the mixer, and a governor inserted in the fuel passage. The governor is comprised of a first gas room, a second gas room, an opening between the first gas room and the second gas room, and an atmospheric pressure room defined in the second gas room by a first diaphragm. The opening between the first gas room and the second gas room is opened and closed by a valve. A lever is fixed to the valve and a first spring urges the valve to close the opening. A means is supplied for varying the urging force of the spring.

BRIEF DESCRIPTION OF THE DRAWINGS

A more complete appreciation of the invention and many of its advantages will be readily apparent as it becomes better understood from the following detailed description with reference to the drawings, wherein.

DETAILED DESCRIPTION OF THE INVENTION

Figure 1:
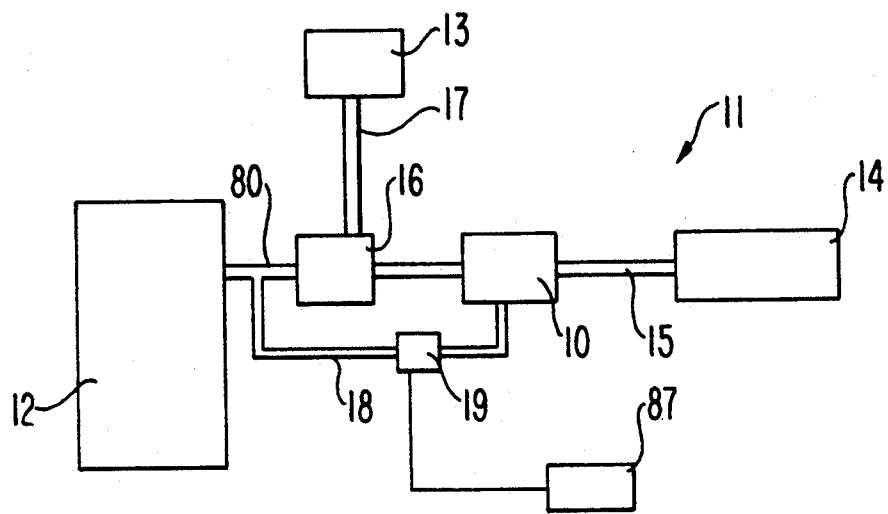
FIG. 1 is a block diagram of a fuel supplying system of a gas-engine according to an embodiment of the invention.
Figure 2:
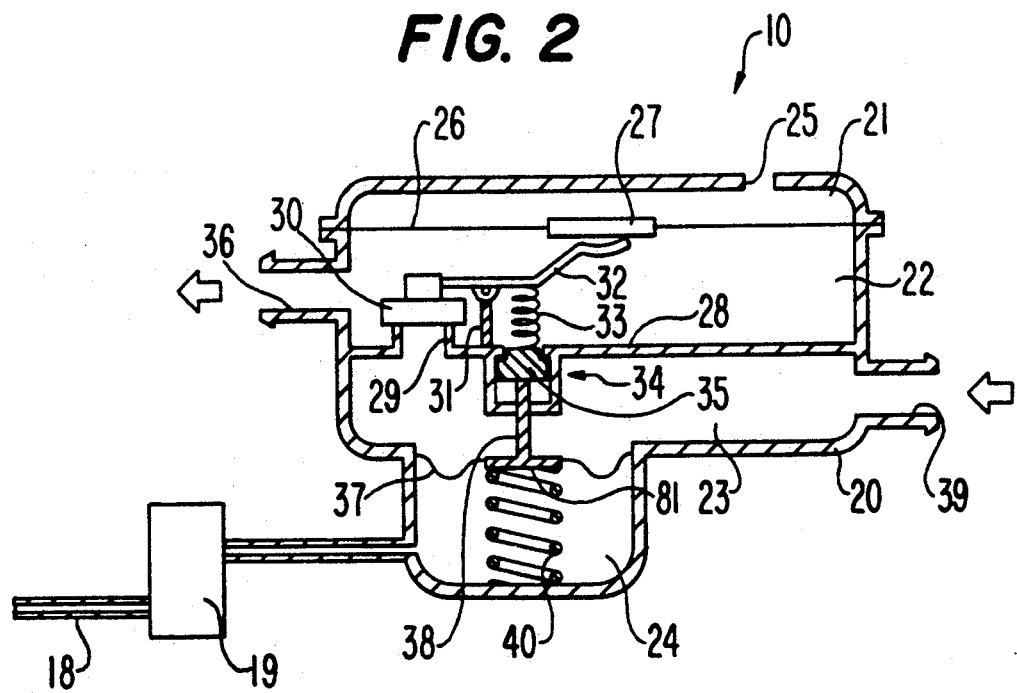
FIG. 2 is a cross-sectional view of a governor according to an embodiment of the invention.

Referring first to FIG. 1, wherein fuel supplying system 11 of gas-engine 12 is shown, gas is supplied from gas tank 14 to mixer 16 via fuel passage 15. In gas tank 14, gas is stored at a pressure higher than atmospheric pressure. Governor 10 is inserted in fuel passage 15. Air is supplied from air cleaner 13 to mixer 16 via air passage 17. Gas and air are mixed in mixer 16. The mixture is supplied to gas-engine 12 via intake manifold 80. Referring additionally to FIG. 2, negative pressure is supplied from intake manifold 80 to negative pressure room 24 of the governor 10 via negative pressure passage 18. Solenoid valve 19 is located in negative pressure passage 18. Solenoid valve 19 is controlled by central processing unit 87.

Referring to FIG. 2, governor 10 is explained. Atmospheric pressure room 21, second gas room 22, first gas room 23 and negative pressure room 24 are formed in housing 20. First diaphragm 26 separates atmospheric pressure room 21 and second gas room 22. Plate 27 is formed integrally with first diaphragm 26. Dividing plate 28 separates second gas room 22 and first gas room 23. Second gas room 22 is in fluid communication with first gas room 23 via opening 29.

Valve 30 opens or closes opening 29 and is formed integrally with a first end of lever 32. A second end of lever 32 contacts with plate 27. Lever 32 is supported by lever supporting member 31. Valve 30 is urged by first spring 33 to close opening 29. One end of first spring 33 is fixed to pedestal 35 which is supported in supporting member 34. Pedestal 35 is able to slide up or down along supporting member 34.

Second diaphragm 37 separates first gas room 23 and negative pressure room 24. Plate 81 is formed integrally with second diaphragm 37. Pedestal 35 is connected with plate 81 by rod 38. Second spring 40 urges plate 81 upward.

Second gas room 22 is communicated with mixer 16 via fuel passage 15 and outlet 36 formed in housing 20. First gas room 23 is communicated with gas tank 14 via fuel passage 15 and inlet 39 formed in housing 20.

Figure 3:
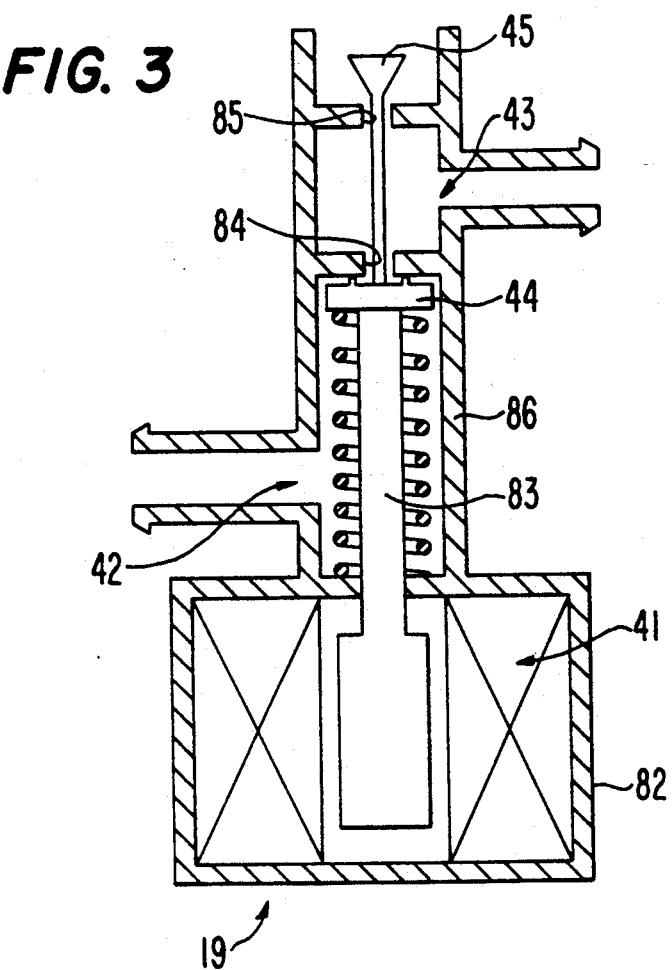
FIG. 3 is a cross-sectional view of a solenoid valve according to an embodiment of the invention.

Referring to FIG. 3, solenoid valve 19 is explained. A housing 82 of solenoid valve 19 has inlet 42 and outlet 43. First valve 44 and second valve 45 are formed integrally with rod 83 which is actuated by solenoid system 41. First opening 84 is opened or closed by first valve 44, and second opening 85 is opened or closed by second valve 45. Rod 83 is urged by spring 86 to close opening 84.

In the above mentioned fuel supplying system 11 of gas-engine 12, when gas-engine 12 is running normally, solenoid valve 19 is in the condition shown in FIG. 3. Therefore, atmospheric pressure is supplied to outlet 43 and negative pressure room 24. Thus, plate 81 is urged upward by second spring 40, and pedestal 35 is located at its highest position in supporting member 34. In this condition, the urging force of first spring 33 is F1. Consequently, valve 30 is urged downward with force F1.

Negative pressure in the intake manifold 80 results in negative pressure being supplied to second gas room 22 via fuel passage 15. When there is negative pressure in second gas room 22, plate 27 is urged downward by the pressure difference between atmospheric pressure room 21 and second gas room 22. Thus, by lever 32 pushing against urging force F1 of first spring 33, valve 30 opens opening 29. Therefore, gas in first gas room 23 flows into second gas room 22 via opening 29. The pressure of the gas flowing into second gas room 22 urges plate 27 upward. Consequently, valve 30 closes opening 29 due to force F1 exerted by spring 33 on lever 32. Gas is supplied to gas-engine 12 at atmospheric pressure by the repeated opening and closing of valve 30.

Figure 4:
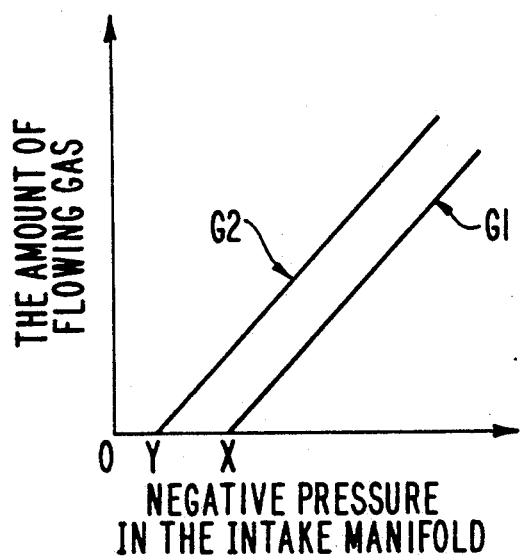
FIG. 4 and FIG. 5 are graphs illustrating the amount of flowing gas as a function of the negative pressure in the intake manifold.

The amount of gas supplied to mixer 16 is much less than the amount of air supplied to mixer 16, because gas-engine 12 is a lean-burn type engine. Line G1, shown in FIG. 4, illustrates the amount of flowing gas as a function of the negative pressure in the intake manifold when opening 85 is open and opening 84 is closed. Thus, force F1 is being exerted on lever 32. Point "X" shown in FIG. 4 is the starting point for the supplying of gas at urging force F1. The starting point is variable along the horizontal axis according to the urging force of first spring 33.

On the other hand, when the gas-engine 12 is started or at a high load, it needs more gas than when it is running normally. So, an electric current is supplied to solenoid system 41 from central processing unit 87. Rod 83 is urged downward against the force of spring 86. Consequently, second opening 85 is closed by second valve 45 and first opening 84 is opened.

Figure 6:
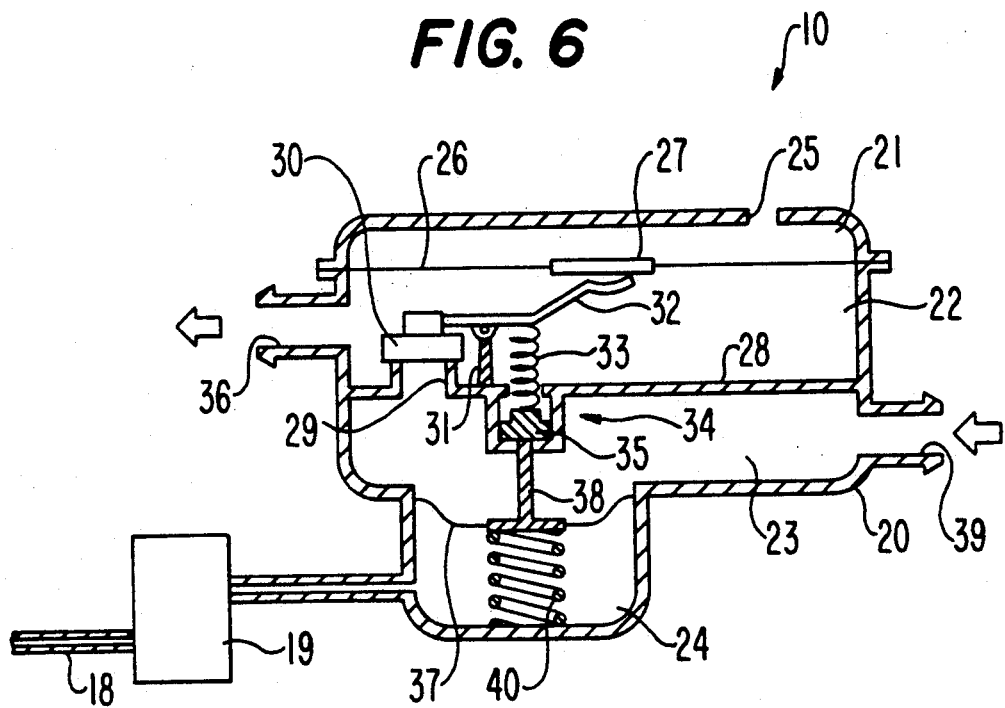
FIG. 6 is a cross-sectional view of a governor according to an embodiment of the invention.

Thus, the negative pressure in intake manifold 80 is supplied to negative pressure room 24. Therefore, plate 81 is urged downward by the pressure difference between negative pressure room 24 and first gas room 23, and pedestal 35 is located at its lowest portion in supporting member 34, as shown in FIG. 6. In this condition, the urging force of first spring 33 is F2. Consequently, valve 30 is urged downward with force F2.

Line G2, shown in FIG. 4, illustrates the amount of flowing gas as a function of the negative pressure in the intake manifold when opening 85 is closed and opening 84 is opened and, thus, force F2 is being exerted on lever 32. Point "Y", shown in FIG. 4, is the starting point for the supplying of gas at the urging force F2.

Figure 5:
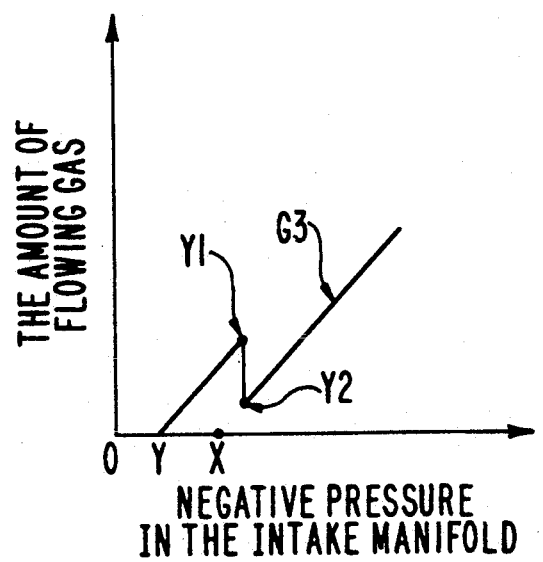

Line G3, shown in FIG. 5, illustrates the character of flowing gas to gas-engine 12 during starting and then later during normal operation. When the gas-engine 12 is started, the amount of flowing gas is increased and the gas is supplied to gas-engine 12 at atmospheric pressure. The time it takes the amount of flowing gas to drop from point "Y1" to point "Y2" is relatively slow.

Figure 7:
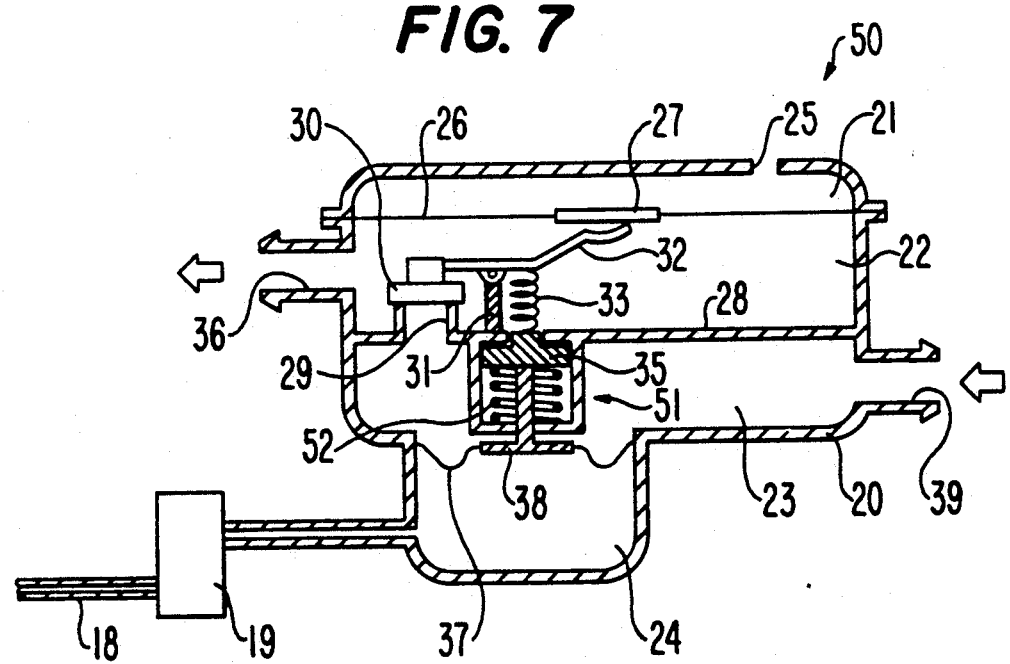
FIG. 7 is a view similar to FIG. 2, showing a second embodiment.

A second embodiment is shown in FIG. 7. It differs from the first embodiment in that second spring 52 is located in supporting member 51 of governor 50 rather than in negative pressure room 24.

Figure 8:
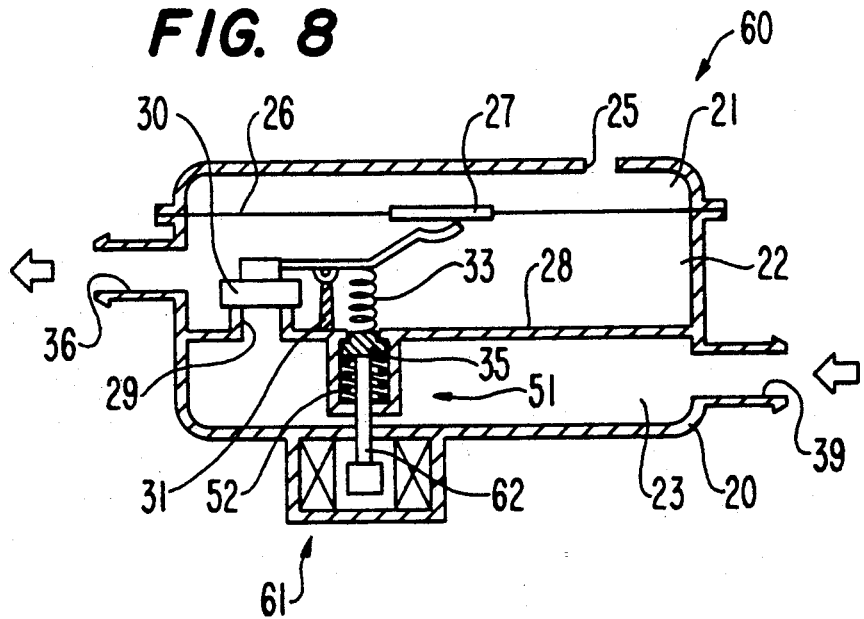
FIG. 8 is a view similar to FIG. 2, showing a third embodiment.
Figure 9:
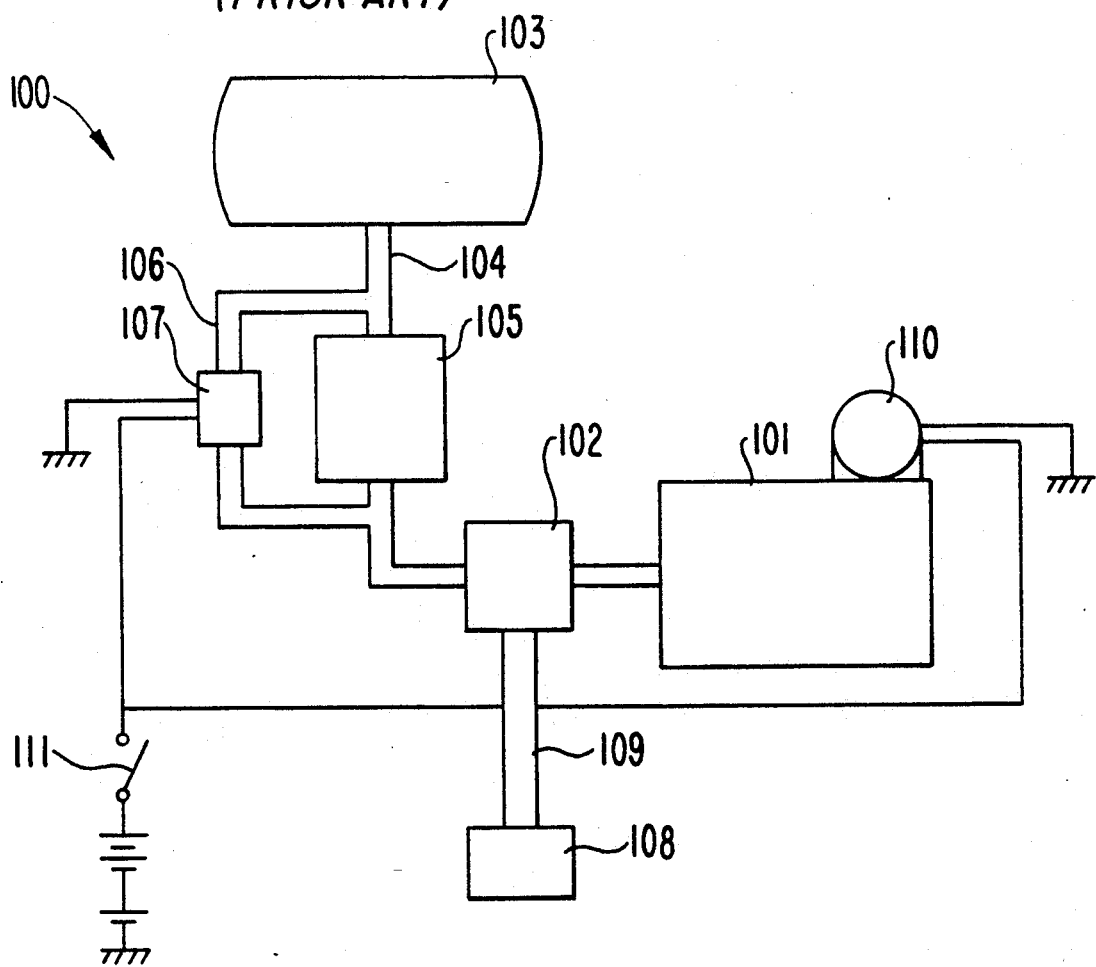
FIG. 9 is block diagram of a conventional fuel supplying system of a gas-engine.

A third embodiment is shown in FIG. 8. It differs from the first embodiment in that negative pressure passage 18, solenoid valve 19, and negative pressure room 24 are not needed. The pedestal 35 is moved directly by a rod of solenoid system 62.

Numerous modifications and variations of the present invention are possible in light of the above teachings. It is therefore understood that within the scope of the following claims, the invention may be practiced otherwise than as specifically described.

I claim:
1. A fuel supplying system of a gas engine, comprising:
   a mixer for mixing gas and air;
   an intake manifold connecting said mixer with the gas engine and for supplying a gas-air mixture to the gas engine;
   a gas tank;
   a fuel passage connecting said mixer with said gas tank and for supplying gas to said mixer;
   an air passage connected to said mixer and for supplying air to said mixer; and
   a governor inserted in said fuel passage and having:
   a housing;
   a first gas room;
   a second gas room located adjacent said first gas room and in communication with said first gas room through an opening;
   a valve for opening and closing said opening;
   a lever fixed to said valve and supported on a portion of said housing which separates said first and second gas rooms;
   a first spring attached on one end to said lever and having an initial bias which urges said valve to close said opening;
   a supporting member attached to said portion of said housing which separates said first and second gas rooms;
   a pedestal moveably supported by said supporting member and attached to the other end of said first spring, said pedestal being moveable to change the initial bias of said first spring;
   an atmosphere pressure room located adjacent said second gas room;
   a first diagram separating said atmospheric pressure room and said second gas room;
   a negative pressure room located adjacent said first gas room;
   a second diaphragm separating said negative pressure room and said first gas room;
   a rod connecting said pedestal and said second diaphragm;
   a negative pressure passage connecting said negative pressure room and said intake manifold;
   a solenoid valve located in said negative pressure passage for regulating the pressure in said negative pressure room; and
   means for biasing said moveable pedestal into a position where said first spring has its initial bias.

2. A fuel supplying system of gas-engine as set forth in claim 1, wherein said solenoid valve supplies an atmospheric pressure or a negative pressure to said negative pressure room.

3. A fuel supplying system of a gas engine as set forth in claim 1, wherein said biasing means includes a second spring located in said negative pressure room.

4. A fuel supplying system of a gas engine as set forth in claim 1, wherein said supporting member is in the form of a chamber and wherein said biasing means includes a second spring located in said supporting member.

5. A fuel supplying system of a gas engine, comprising:
- a mixer for mixing gas and air;
- an intake manifold connecting said mixer with the gas engine and for supplying a gas-air mixture to the gas engine;
- a gas tank;
- a fuel passage connecting said mixer with said gas tank and for supplying gas to said mixer;
- an air passage connected to said mixer and for supplying air to said mixer; and
- a governor inserted into said fuel passage and having:
  - a housing;
  - a first gas room;
  - a second gas room located adjacent said first gas room and in communication with said first gas room through an opening;
  - a valve for opening and closing said opening;
  - a lever supported on a portion of said housing which separates said first and second gas rooms and fixed to said valve;
  - a first spring attached on one end to said lever and having an initial bias which urges said valve to close said opening;
  - a supporting member attached to said portion of said housing which separates said first and second gas rooms;
  - a pedestal moveably supported by said supporting member and attached to the other end of said first spring, said pedestal being moveable to change the initial bias of said first spring;
  - an atmospheric pressure room located adjacent said second gas room;
  - a first diaphragm separating said atmospheric pressure room and said second gas room;
  - a rod connected on one end to said pedestal;
  - a solenoid connected to the other end of said rod and for moving said pedestal to change the initial bias of said first spring.

6. A governor, for use in a fuel supplying system of a gas engine, comprising:
- a housing;
- a first gas room;
- a second gas room located adjacent said first gas room and in communication with said first gas room through an opening;
- a valve for opening and closing said opening;
- an atmospheric pressure room located adjacent said second gas room;
- a first diaphragm separating said atmospheric pressure room and said second gas room;
- a lever supported on a portion of said housing which separates said first and second gas rooms and fixed to said valve on a first end and in contact with said first diaphragm on a second end;
- a first spring attached on one end to said lever and having an initial bias which urges said valve to close said opening;
- a supporting member attached to said portion of said housing which separates said first and second gas rooms;
- a pedestal moveably supported by said supporting member and attached to the other end of said first spring, said pedestal being moveable to change the initial bias of said first spring;
- a rod connected on one end to said pedestal; and
- a solenoid connected to the other end of said rod and for moving said pedestal to change the initial bias of said first spring.

7. A fuel supplying system of a gas engine, comprising:
- a mixer for mixing gas and air;
- an intake manifold connecting said mixer with the gas engine and for supplying a gas-air mixture to the gas engine;
- a gas tank;
- a fuel passage connecting said mixture with said gas tank and for supplying gas to said mixer;
- an air passage connected to said mixer and for supplying air to said mixer; and
- a governor inserted in said fuel passage and having:
  - a housing;
  - a first gas room;
  - a second gas room located adjacent such first gas room and in communication with said first gas room through an opening;
  - an atmosphere pressure room located adjacent to said second gas room;
  - a first diagram separating said atmospheric pressure room and said second gas room;
  - a valve for opening and closing said opening;
  - a lever supported on a portion of said housing which separates said first and second gas rooms and fixed to said valve on a first end and in contact with said first diaphragm on a second end;
  - a first spring attached on one end to said lever and having an initial bias which urges said valve to close said opening;
  - a supporting member attached to said portion of said housing which separates said first and second gas rooms;
  - a pedestal moveably supported by said supporting member and attached to the other end of said first spring, said pedestal being moveable to change the initial bias of said first spring;
  - a negative pressure room located adjacent to said first gas room;
  - a second diaphragm separating said negative pressure room and said first gas room;
  - a rod connecting said pedestal and said second diaphragm;
  - a negative pressure passage connecting said negative pressure room and said intake manifold;
  - a solenoid valve located in said negative pressure passage for regulating the pressure in said negative pressure room; and
  - means for biasing said moveable pedestal to a position where said first spring has its initial bias.

8. A fuel supplying system as set forth in claim 7, wherein said solenoid valve supplies an atmospheric pressure or a negative pressure to said negative pressure room.

9. A fuel supplying system as set forth in claim 7 wherein said biasing means includes a second spring located in said negative pressure room.

10. A fuel supplying system as set forth in claim 7, wherein said supporting member is in the form of a chamber, and wherein said biasing means includes a second spring located in said supporting member.

* * * * *